United States Patent
Kook et al.

(10) Patent No.: US 9,664,259 B1
(45) Date of Patent: May 30, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Gyeonggi-do (KR); Seongwook Ji, Gyeonggi-do (KR); Woochurl Son, Gyeonggi-do (KR); Hyun Sik Kwon, Seoul (KR); Woo Jin Chang, Gyeonggi-do (KR); Seong Wook Hwang, Gyeonggi-do (KR); Wonmin Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/252,584

(22) Filed: Aug. 31, 2016

(30) Foreign Application Priority Data

Mar. 16, 2016 (KR) .................. 10-2016-0031482

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)
(58) Field of Classification Search
None
See application file for complete search history.

(56) References Cited

U.S. PATENT DOCUMENTS

| | | | |
|---|---|---|---|
| 2014/0080657 A1* | 3/2014 | Goleski | F16H 3/62 475/275 |
| 2015/0119185 A1* | 4/2015 | Lippert | F16H 3/62 475/275 |
| 2016/0116026 A1* | 4/2016 | Muller | F16H 3/666 475/269 |
| 2016/0146296 A1* | 5/2016 | Cho | F16H 3/66 475/275 |
| 2016/0146297 A1* | 5/2016 | Cho | F16H 3/66 475/269 |
| 2016/0146299 A1* | 5/2016 | Cho | F16H 3/66 475/269 |

* cited by examiner

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A planetary gear train of an automatic transmission for a vehicle is provided. Ten or more forward speeds and one or more reverse speed are achieved by a planetary gear train of an automatic transmission for a vehicle. The vehicle includes an input shaft, an output shaft, four planetary gear sets respectively having three rotational elements, and six control elements to selectively connect the rotational elements and a transmission housing.

8 Claims, 2 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 | ● | | | | ● | ● | 4.800 |
| D2 | | | ● | | ● | ● | 3.022 |
| D3 | ● | | ● | | | ● | 2.157 |
| D4 | | ● | | ● | | ● | 1.778 |
| D5 | ● | ● | | | | ● | 1.530 |
| D6 | ● | | | ● | | ● | 1.254 |
| D7 | ● | | ● | ● | | | 1.000 |
| D8 | ● | | | ● | ● | | 0.866 |
| D9 | | ● | | | ● | | 0.682 |
| D10 | | ● | | ● | ● | | 0.630 |
| REV | | | | ● | ● | ● | -6.044 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0031482 filed in the Korean Intellectual Property Office on Mar. 16, 2016, the entire contents of which are incorporated herein by reference.

BACKGROUND (a) Field of the Invention

The present invention relates to an automatic transmission for a vehicle, and more particularly, to a planetary gear train of an automatic transmission for a vehicle that minimizes complexity, realizing at least ten forward speeds and at least one reverse speed, improves power delivery performance and fuel consumption by multi-stages of an automatic transmission, and improves driving stability of a vehicle by utilizing a low rotation speed of an engine.

(b) Description of the Related Art

Generally, in the field of an automatic transmission, a greater number of shift-stages provides technology for enhancement of fuel consumption and drivability of a vehicle. In particular, increases to the cost of oil has resulted in the requirement to enhance fuel consumption of a vehicle. In other words, research for an engine has been conducted to achieve weight reduction and to enhance fuel and research on an automatic transmission has been conducted to simultaneously provide better drivability and fuel consumption by achieving a greater number of shift stages.

For example to achieve more shift-stages for an automatic transmission, the number of components is typically increased, which may deteriorate installability, a production cost, weight and/or power flow efficiency. Therefore, to maximally enhance fuel consumption of an automatic transmission having more shift-stages, improved efficiency should include a smaller number of components.

Recently, an eight-speed automatic transmission has been introduced and a planetary gear train for an automatic transmission enabling more shift-stages is continuously required. An automatic transmission of eight or more shift-stages typically includes three to four planetary gear sets and five to six control elements (e.g., frictional elements). In other words, the total length may be increased and may cause a deterioration of installability. Further, disposing planetary gear sets in parallel or employing dog clutches instead of wet-type control elements has been attempted. However, such an arrangement may not be widely applicable, and using dog clutches may deteriorate shift-feel.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle with shift-stages of at least ten forward speeds and at least one reverse speed and reduces the number of components, improves power delivery performance and fuel consumption by multi-stages of an automatic transmission, and improves driving stability of a vehicle by utilizing a lower rotation speed of an engine.

A planetary gear train according to an exemplary embodiment of the present invention may include an input shaft configured to receive an engine torque, an output shaft configured to output a shifted torque, a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, a first shaft connecting the first rotational element and the fourth rotational element, a second shaft that connect the second rotational element and the eighth rotational element and twelfth rotational element, a third shaft connected with the third rotational element, a fourth shaft connected with the fifth rotational element and directly connected with the input shaft, a fifth shaft that connect the sixth rotational element and the seventh rotational element, a sixth shaft connected with the ninth rotational element, and selectively connected with the second shaft, a seventh shaft connected with the tenth rotational element, and selectively connected with the fourth shaft, the fifth shaft, and sixth shaft, respectively, and an eighth shaft connected with the eleventh rotational element and directly connected with the output shaft. The first shaft and the third shaft may be selectively connected with the transmission housing respectively.

The first, second, and third rotational elements of the first planetary gear set may be respectively a first sun gear, a first planet carrier, and a first ring gear of the first planetary gear set. The fourth, fifth, and sixth rotational elements of the second planetary gear may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

A planetary gear train according to an exemplary embodiment of the present invention may further include a first clutch that selectively connects the fourth shaft and the seventh shaft, a second clutch that selectively connects the second shaft and the sixth shaft, a third clutch that selectively connects the fifth shaft and the seventh shaft, a fourth clutch that selectively connects the sixth shaft and the seventh shaft, a first brake that selectively connects the first shaft and the transmission housing, and a second brake that selectively connects the third shaft and the transmission housing.

A planetary gear train according to an exemplary embodiment of the present invention may be configured to operate at least ten forward speeds and at least one reverse speed by operation of the four planetary gear sets of simple planetary gear sets by an adjustment of six control elements. Additionally, a planetary gear train according to an exemplary embodiment of the present invention may substantially improve driving stability by realizing shift-stages appropriate for rotation speed of an engine due to multi-stages of an automatic transmission. In particular, a planetary gear train according to an exemplary embodiment of the present invention may maximize engine driving efficiency by multi-stages of an automatic transmission, and may improve power delivery performance and fuel consumption.

Further, effects that may be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The above and other objects, features and other advantages of the present invention will be more clearly understood from the following detailed description when taken in conjunction with the accompanying drawings, in which:

FIG. 2 is an exemplary operational chart for respective control elements at respective shift-stages in a planetary gear train according to an exemplary embodiment of the present invention.

DETAILED DESCRIPTION

Figure 1:
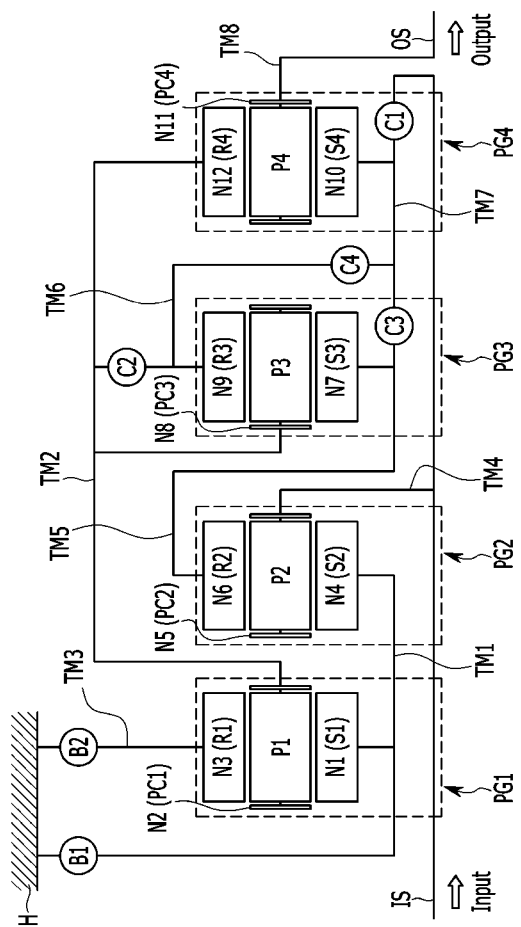
FIG. 1 is an exemplary schematic diagram of a planetary gear train according to an exemplary embodiment of the present invention.

The present invention will be described more fully hereinafter with reference to the accompanying drawings, in which exemplary embodiments of the invention are shown. The drawings and description are to be regarded as illustrative in nature and not restrictive, and like reference numerals designate like elements throughout the specification. In the following description, dividing names of components into first, second and the like is to divide the names because the names of the components are the same as each other and an order thereof is not particularly limited.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary schematic diagram of a planetary gear train according to an exemplary embodiment of the present invention. Referring to FIG. 1, a planetary gear train according to an exemplary embodiment of the present invention may include first, second, third, and fourth planetary gear sets PG1, PG2, PG3, and PG4 arranged on a same axis, an input shaft IS, an output shaft OS, eight shafts TM1 to TM8 connected with rotational elements of the first, second, third, and fourth planetary gear sets PG1, PG2, PG3, and PG4, control elements of four clutches C1 to C4 and two brakes B1 and B2, and a transmission housing H.

Torque input from the input shaft IS may be shifted by cooperative operation of the first, second, third, and fourth planetary gear sets PG1, PG2, PG3, and PG4, and may then output through the output shaft OS. The planetary gear sets may be arranged in the order of first, second, third, and fourth planetary gear sets PG1, PG2, PG3, and PG4, from an engine side. The input shaft IS may be an input member and the torque from a crankshaft of an engine may be input into the input shaft IS, after being torque-converted using a torque converter. The output shaft OS may be an output member and being arranged on a same axis as the input shaft IS, delivers a shifted driving torque to a drive shaft using a differential apparatus.

The first planetary gear set PG1 may be a single pinion planetary gear set, and may include a first sun gear S1, a first planet carrier PC1 configured to support first pinion gear P1 externally engaged with the first sun gear S1 and a first ring gear R1 internally gear-meshed with the first pinion gear P1. The first sun gear S1 may operate as a first rotational element N1, the first planet carrier PC1 may operate as a second rotational element N2, and the first ring gear R1 may operate as a third rotational element N3. The second planetary gear set PG2 may be a single pinion planetary gear set and may include a second sun gear S2, a second planet carrier PC2 to support second pinion gear P2 externally engaged with the second sun gear S2, and a second ring gear R2 internally gear-meshed with the second pinion gear P2. The second sun gear S2 may operate as a fourth rotational element N4, the second planet carrier PC2 may operate as as a fifth rotational element N4, and the second ring gear R2 acts as a sixth rotational element N6.

The third planetary gear set PG3 may be a single pinion planetary gear set and may include a third sun gear S3, a third planet carrier PC3 to support third pinion gear P3 externally engaged with the third sun gear S3, and a third ring gear R3 internally gear-meshed with the third pinion gear P3. The third sun gear S3 may operate as a seventh rotational element N7, the third planet carrier PC3 may operate as an eighth rotational element N8, and the third ring gear R3 may operate as a ninth rotational element N9. The fourth planetary gear set PG4 may be a single pinion planetary gear set and may include a fourth sun gear S4, a fourth planet carrier PC4 to support fourth pinion gear P4 externally engaged with the fourth sun gear S4, and a fourth ring gear R4 that may internally gear-meshed with the fourth pinion gear P4. The fourth sun gear S4 may operate as a tenth rotational element N10, the fourth planet carrier PC4 may operate as an eleventh rotational element N11, and the fourth ring gear R4 may operate as a twelfth rotational element N12.

In the arrangement of the first, second, third, and fourth planetary gear sets PG1, PG2, PG3 and PG4, the first rotational element N1 may be directly connected with the fourth rotational element N4, the second rotational element N2 may be directly connected with the eighth rotational element N8 and the twelfth rotational element N12, and the sixth rotational element N6 may be directly connected with the seventh rotational element N7, by eight shafts TM1 to TM8.

The eight shafts TM1 to TM8 may be arranged as follows. Each of the eight shafts TM1 to TM8 may be a rotational member that directly connects the input and output shafts and rotational elements of the planetary gear sets PG1, PG2, PG3, and PG4, or may be a fixed member fixed to the transmission housing H. The first shaft TM1 may connect the first rotational element N1 (e.g., the first sun gear S1) and the fourth rotational element N4 (e.g., the second sun gear S2) and may selectively connect with the transmission housing H and may thereby selectively be configured to operate as a fixed element. The second shaft TM2 may connect the second rotational element N2 (e.g., first planet carrier PC1), the eighth rotational element N8 (e.g., third planet carrier PC3) and the twelfth rotational element N12 (e.g., fourth ring gear R4).

The third shaft TM3 may be connected with the third rotational element N3 (e.g., first ring gear R1), and may be selectively connected with the transmission housing H, to selectively operate as a fixed element. The fourth shaft TM4 may be connected with the fifth rotational element N5 (e.g., second planet carrier PC2) and may be directly connected with the input shaft IS, to operate as an input element.

The fifth shaft TM5 may connect the sixth rotational element N6 (e.g., second ring gear R2) and the seventh rotational element N7 (e.g., third sun gear S3). The sixth shaft TM6 may be connected with the ninth rotational element N9 (e.g., third ring gear R3), and may be selectively connected with the second shaft TM2. The seventh shaft TM7 may be connected with the tenth rotational element N10 (e.g., fourth sun gear S4) and may be selectively connected with the fourth shaft TM4, the fifth shaft TM5, and the sixth shaft TM6, respectively.

The eighth shaft TM8 may be connected with the eleventh rotational element N11 (e.g., fourth planet carrier PC4), may be directly connected with the output shaft OS, to operate as an output element. The eight shafts TM1 to TM8, the input shaft IS, and the output shaft OS may be selectively connected with one another by control elements of four clutches C1, C2, C3, and C4. The eight shafts TM1 to TM8 may be selectively connected with the transmission housing H, by control elements of two brakes B1 and B2.

The four clutches C1 to C4 and the two brakes B1 and B2 may be arranged as follows. The first clutch C1 may be disposed between the fourth shaft TM4 and the seventh shaft TM7 to selectively connect the fourth shaft TM4 and the seventh shaft TM7 to adjust power delivery therebetween. The second clutch C2 may be disposed between the second shaft TM2 and the sixth shaft TM6 to selectively connect the second shaft TM2 and the sixth shaft TM6 to adjust power delivery therebetween. The third clutch C3 may be disposed between the fifth shaft TM5 and the seventh shaft TM7 to selectively connect the fifth shaft TM5 and the seventh shaft TM7 to adjust power delivery therebetween. The fourth clutch C4 may be disposed between the sixth shaft TM6 and the seventh shaft TM7 to selectively connect the sixth shaft TM6 and the seventh shaft TM7 to adjust power delivery therebetween.

The first brake B1 may be disposed between the first shaft TM1 and the transmission housing H to selectively connect the first shaft TM1 to the transmission housing H. The second brake B2 may be disposed between the third shaft TM3 and the transmission housing H to selectively connect the third shaft TM3 to the transmission housing H. The control elements of the first, second, third, and fourth clutches C1, C2, C3, and C4 and the first and second brakes B1 and B2 may be multi-plate hydraulic pressure friction devices frictionally engaged by hydraulic pressure.

FIG. 2 is an exemplary operational chart for respective control elements at respective shift-stages in a planetary gear train according to an exemplary embodiment of the present invention. Referring to FIG. 2, a planetary gear train according to an exemplary embodiment of the present invention may provide ten forward speeds and one reverse speed by operation of three control elements among the first, second, third, and fourth clutches C1, C2, C3, and C4 and the first and second brakes B1 and B2 at respective shift-stages.

In the forward first speed D1, the first clutch C1 and the first and second brakes B1 and B2 may be operated simultaneously with gear ratio of about 4.800. Accordingly, the seventh shaft TM7 may be connected with the input shaft IS by the operation of the first clutch C1. The torque of the input shaft IS may be input to the fourth shaft TM4 and the seventh shaft TM7. Further, the first shaft TM1 may operate as a fixed element by the operation of the first brake B1, and the third shaft TM3 may operate as a fixed element by the operation of the second brake B2. In particular, the forward first speed may be generated by cooperative operation of respective shafts and may output a shifted torque to the output shaft OS connected with the eighth shaft TM8.

In the forward second speed D2, the third clutch C3 and the first and second brakes B1 and B2 may be operated simultaneously with a gear ratio of about 3.022. Accordingly, the fifth shaft TM5 may be connected with the seventh shaft TM7 by the operation of the third clutch C3. The torque of the input shaft IS may be input to the fourth shaft TM4. Additionally, the first shaft TM1 may operate as a fixed element by the operation of the first brake B1, and the third shaft TM3 may operate as a fixed element by the operation of the second brake B2. In particular, the forward second speed may be generated by cooperative operation of respective shafts and may output a shifted torque to the output shaft OS connected with the eighth shaft TM8.

In the forward third speed D3, the first and third clutches C1 and C3 and the second brake B2 may be operated simultaneously with a gear ratio of about 2.157. Accordingly, the seventh shaft TM7 may be connected with the input shaft IS by the operation of the first clutch C1 and the fifth shaft TM5 may be connected with the seventh shaft TM7 by the operation of the third clutch C3. The torque of the input shaft IS may be input to the fourth shaft TM4 and the seventh shaft TM7. Additionally, the third shaft TM3 may operate as a fixed element by the operation of the second brake B2. In particular, the forward third speed may be generated by cooperative operation of respective shafts and may output a shifted torque to the output shaft OS connected with the eighth shaft TM8.

In the forward fourth speed D4, the second and fourth clutches C2 and C4 and the second brake B2 may be operated simultaneously with a gear ratio of about 1.778.

Accordingly, the second shaft TM2 may be connected with the sixth shaft TM6 by the operation of the second clutch C2 and the sixth shaft TM6 may be connected with the seventh shaft TM7 by the operation of the fourth clutch C4. The torque of the input shaft IS may be input to the fourth shaft TM4. Additionally, the third shaft TM3 may operate as a fixed element by the operation of the second brake B2. In particular, the forward fourth speed may be generated by cooperative operation of respective shafts and may output a shifted torque to the output shaft OS connected with the eighth shaft TM8.

In the forward fifth speed D5, the first and second clutch C1 and C2 and the second brake B2 may be operated simultaneously with a gear ratio of about 1.530. Accordingly, the seventh shaft TM7 may be connected with the input shaft IS by the operation of the first clutch C1 and the second shaft TM2 may be connected with the sixth shaft TM6 by the operation of the second clutch C2 The torque of the input shaft IS may be input to the fourth shaft TM4 and the seventh shaft TM7. Additionally, the third shaft TM3 may operate as a fixed element by the operation of the second brake B2. In particular the forward fifth speed may be generated by cooperative operation of respective shafts and may output a shifted torque to the output shaft OS connected with the eighth shaft TM8.

In the forward sixth speed D6, the first and fourth clutches C1 and C4 and the second brake B2 may be operated simultaneously with a gear ratio of about 1.254. Accordingly, the seventh shaft TM7 may be connected with the input shaft IS by the operation of the first clutch C1 and the sixth shaft TM6 may be connected with the seventh shaft TM7 by the operation of the fourth clutch C4. The torque of the input shaft IS may be input to the fourth shaft TM4 and the seventh shaft TM7. Additionally, the third shaft TM3 may operate as a fixed element by the operation of the second brake B2. In particular, the forward sixth speed may be generated by cooperative operation of respective shafts and may output a shifted torque to the output shaft OS connected with the eighth shaft TM8.

In the forward seventh speed D7, the first, third, and fourth clutches C1, C3, and C4 may be operated simultaneously with a gear ratio of about 1.000. Accordingly, the seventh shaft TM7 may be connected with the input shaft IS by the operation of the first clutch C1, the fifth shaft TM5 may be connected with the seventh shaft TM7 by the operation of the third clutch C3 and the sixth shaft TM6 may be connected with the seventh shaft TM7 by the operation of the fourth clutch C4. The torque of the input shaft IS may be input to the fourth shaft TM4 and the seventh shaft TM7. In other words, the entire planetary gear sets PG1, PG2, PG3, and PG4 may be configured to integrally rotate. The torque may be output as input, and may generate the forward seventh speed and output the inputted torque to the output shaft OS connected with the eighth shaft TM8.

In the forward eighth speed D8, the first and fourth clutches C1 and C4 and the first brake B1 may be operated simultaneously with a gear ratio of about 0.866. Accordingly, the seventh shaft TM7 may be connected with the input shaft IS by the operation of the first clutch C1 and the sixth shaft TM6 may be connected with the seventh shaft TM7 by the operation of the fourth clutch C4. The torque of the input shaft IS may be input to the fourth shaft TM4 and the seventh shaft TM7. Additionally, the first shaft TM1 may operate as a fixed element by the operation of the first brake B2. In particular, the forward eighth speed may be generated by cooperative operation of respective shafts and may output a shifted torque to the output shaft OS connected with the eighth shaft TM8.

In the forward ninth speed D9, the first and second clutch C1 and C2 and the first brake B1 may be operated simultaneously with a gear ratio of about 0.682. Accordingly, the seventh shaft TM7 may be connected with the input shaft IS by the operation of the first clutch C1 and the second shaft TM2 may be connected with the sixth shaft TM6 by the operation of the second clutch C2. The torque of the input shaft IS may be input to the fourth shaft TM4 and the seventh shaft TM7. Additionally, the first shaft TM1 may operate as a fixed element by the operation of the first brake B1. In particular, the forward ninth speed may be generated by cooperative operation of respective shafts and may output a shifted torque to the output shaft OS connected with the eighth shaft TM8.

In the forward tenth speed D10, the second and fourth clutches C2 and C4 and the first brake B1 may be operated simultaneously with a gear ratio of about 0.630. Accordingly, the second shaft TM2 may be connected with the sixth shaft TM6 by the operation of the second clutch C2 and the sixth shaft TM6 may be connected with the seventh shaft TM7 by the operation of the fourth clutch C4. The torque of the input shaft IS may be input to the fourth shaft TM4. Additionally, the first shaft TM1 may operate as a fixed element by the operation of the first brake B1. In particular, the forward tenth speed may be generated by cooperative operation of respective shafts and may output a shifted torque to the output shaft OS connected with the eighth shaft TM8.

In the reverse speed REV, the fourth clutch C4 and the first and second brakes B1 and B2 may be operated simultaneously with a gear ratio of about −6.044. As a result, the sixth shaft TM6 may be connected with the seventh shaft TM7 by the operation of the fourth clutch C4. The torque of the input shaft IS may be input to the fourth shaft TM4. Additionally, the first shaft TM1 may operate as a fixed element by the operation of the first brake B1 and the third shaft TM3 may operate as a fixed element by the operation of the second brake B2. In particular, the reverse speed by cooperative operation of respective shafts may be generated and may output a shifted torque to the output shaft OS connected with the eighth shaft TM8.

As described above, a planetary gear train according to an exemplary embodiment of the present invention may be configured to operate at least ten forward speeds and at least one reverse speed by four planetary gear sets PG1, PG2, PG3, and PG4 by an adjustment of four clutches C1, C2, C3, and C4 and two brakes B1 and B2. Additionally, a planetary gear train according to an exemplary embodiment of the present invention may be configured to operate shift stages appropriate for rotation speed of an engine due to multi-stages of an automatic transmission and may improve driving stability of a vehicle by utilizing a low rotation speed of an engine. Further, a planetary gear train according to an exemplary embodiment of the present invention may maximize engine driving efficiency by multi-stages of an automatic transmission, and may improve power delivery performance and fuel consumption.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shafts

What is claimed is:

1. A planetary gear train of an automatic transmission for a vehicle, comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first shaft that connects the first rotational element and the fourth rotational element;
   a second shaft that connects the second rotational element and the eighth rotational element and twelfth rotational element;
   a third shaft connected with the third rotational element;
   a fourth shaft connected with the fifth rotational element and directly connected with the input shaft;
   a fifth shaft connecting the sixth rotational element and the seventh rotational element;
   a sixth shaft connected with the ninth rotational element, and selectively connected with the second shaft;
   a seventh shaft connected with the tenth rotational element, and selectively connected with the fourth shaft, the fifth shaft, and sixth shaft, respectively; and
   an eighth shaft connected with the eleventh rotational element and directly connected with the output shaft.

2. The planetary gear train of claim 1, wherein the first shaft and the third shaft are selectively connected with the transmission housing respectively.

3. The planetary gear train of claim 1, wherein:
   the first, second, and third rotational elements of the first planetary gear set are respectively a first sun gear, a first planet carrier, and a first ring gear of the first planetary gear set;
   the fourth, fifth, and sixth rotational elements of the second planetary gear set are respectively a second sun gear, a second planet carrier, and a second ring gear of the second planetary gear set;
   the seventh, eighth, and ninth rotational elements of the third planetary gear set are respectively a third sun gear, a third planet carrier, and a third ring gear of the third planetary gear set; and
   the tenth, eleventh, and twelfth rotational elements of the fourth planetary gear set are respectively a fourth sun gear, a fourth planet carrier, and a fourth ring gear of the fourth planetary gear set.

4. The planetary gear train of claim 2, wherein:
   a first clutch selectively connects the fourth shaft and the seventh shaft;
   a second clutch selectively connects the second shaft and the sixth shaft;
   a third clutch selectively connects the fifth shaft and the seventh shaft;
   a fourth clutch selectively connects the sixth shaft and the seventh shaft;
   a first brake selectively connects the first shaft and the transmission housing; and
   a second brake selectively connects the third shaft and the transmission housing.

5. A planetary gear train of an automatic transmission for a vehicle, comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;
   a third planetary gear set having seventh, eighth, and ninth rotational elements; and
   a fourth planetary gear set having tenth, eleventh, and twelfth rotational elements,
   wherein the input shaft is directly connected with the fifth rotational element,
   the output shaft is directly connected with the eleventh rotational element,
   the first rotational element is directly connected with the fourth rotational element,
   the second rotational element is directly connected with the eighth rotational element and twelfth rotational element,
   the sixth rotational element is directly connected with the seventh rotational element,
   the ninth rotational element is selectively connected with the eighth rotational element, and
   the tenth rotational element is selectively connected with the fifth rotational element, the seventh rotational element, and the ninth rotational element, respectively.

6. The planetary gear train of claim 5, wherein the first rotational element and the third rotational element are selectively connected with the transmission housing respectively.

7. The planetary gear train of claim 5, wherein:
   the first, second, and third rotational elements of the first planetary gear set are respectively a first sun gear, a first planet carrier, and a first ring gear of the first planetary gear set;
   the fourth, fifth, and sixth rotational elements of the second planetary gear set are respectively a second sun gear, a second planet carrier, and a second ring gear of the second planetary gear set;
   the seventh, eighth, ninth rotational element of the third planetary gear set are respectively a third sun gear, a third planet carrier, and a third ring gear of the third planetary gear set; and
   the tenth, eleventh, and twelfth rotational elements of the fourth planetary gear set are respectively a fourth sun gear, a fourth planet carrier, and a fourth ring gear of the fourth planetary gear set.

8. The planetary gear train of claim 6, further comprising:
   a first clutch selectively connects the fifth rotational element and the tenth rotational element;
   a second clutch selectively connects the eighth rotational element and the ninth rotational element;

a third clutch selectively connects the sixth rotational element and the tenth rotational element;
a fourth clutch selectively connects the ninth rotational element and the tenth rotational element;
a first brake selectively connects the first rotational element and the transmission housing; and
a second brake selectively connects the third rotational element and the transmission housing.

\* \* \* \* \*